(12) United States Patent
Yoshida (10) Patent No.: US 8,139,118 B2
(45) Date of Patent: Mar. 20, 2012

(54) OPTIMAL-STATE IMAGE PICKUP CAMERA

(75) Inventor: Junichi Yoshida, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 937 days.

(21) Appl. No.: 11/109,040

(22) Filed: Apr. 18, 2005

(65) Prior Publication Data

US 2005/0237392 A1 Oct. 27, 2005

(30) Foreign Application Priority Data

Apr. 26, 2004 (JP) ................................. 2004-129218

(51) Int. Cl.
*H04N 5/225* (2006.01)
(52) U.S. Cl. ........... 348/207.2; 348/62; 348/65; 348/73; 348/333.01
(58) Field of Classification Search ............... 348/207.2, 348/218.1, 333.01, 207.99–376, 62, 65, 73, 348/311–312; 358/2.1; 382/190, 276–308; 353/70
See application file for complete search history.

(56) References Cited

U.S. PATENT DOCUMENTS

| | | | | |
|---|---|---|---|---|
| 5,266,805 | A * | 11/1993 | Edgar | ............................ 250/330 |
| 5,583,565 | A | 12/1996 | Cortjens et al. | |
| 5,598,209 | A | 1/1997 | Cortjens et al. | |
| 5,671,012 | A * | 9/1997 | Oyashiki et al. | ........... 348/211.7 |
| 5,946,127 | A | 8/1999 | Nagata | |
| 6,236,431 | B1 | 5/2001 | Hirasawa et al. | |
| 6,367,933 | B1 * | 4/2002 | Chen et al. | ........................ 353/69 |
| 6,574,433 | B1 * | 6/2003 | Stuempfl | ......................... 396/25 |
| 6,584,433 | B1 * | 6/2003 | Zhang et al. | ................... 702/189 |
| 6,734,914 | B1 | 5/2004 | Nishimura et al. | |
| 6,753,907 | B1 * | 6/2004 | Sukthankar et al. | ....... 348/222.1 |
| RE38,759 | E * | 7/2005 | Suzuki | ........................ 348/220.1 |
| 6,965,693 | B1 * | 11/2005 | Kondo et al. | .................. 382/190 |
| 7,260,259 | B2 * | 8/2007 | Comaniciu et al. | ............ 382/173 |
| 7,301,569 | B2 * | 11/2007 | Kinjo et al. | ................. 348/231.5 |
| 7,356,763 | B2 * | 4/2008 | Lin et al. | ........................ 715/205 |
| 7,386,150 | B2 * | 6/2008 | Fleisher | ......................... 382/103 |
| 2001/0010559 | A1 | 8/2001 | Hirasawa et al. | |
| 2002/0044206 | A1 * | 4/2002 | Kyuma et al. | .................. 348/240 |
| 2002/0057345 | A1 * | 5/2002 | Tamaki et al. | ................. 348/207 |
| 2002/0118292 | A1 | 8/2002 | Baron | |

(Continued)

FOREIGN PATENT DOCUMENTS

CN 1477440 A 2/2004

(Continued)

OTHER PUBLICATIONS

Japanese Office Action (and English translation thereof) dated Dec. 16, 2008, issued in a counterpart Japanese Application.

*Primary Examiner* — Tuan Ho
*Assistant Examiner* — Kent Wang
(74) *Attorney, Agent, or Firm* — Holtz, Holtz, Goodman & Chick, PC (57) ABSTRACT

A digital camera that picks up an image of a print/picture and displays it in a monitor frame image. The camera comprises a CPU that identifies an area of the image of the print/picture and drives an image pickup unit such that the identified area of the image of the print/picture is placed in an optimal state in the frame image.

7 Claims, 8 Drawing Sheets

DIGITAL STILL CAMERA

U.S. PATENT DOCUMENTS

| | | | |
|---|---|---|---|
| 2002/0159637 A1* | 10/2002 | Echigo et al. | 382/190 |
| 2003/0025804 A1* | 2/2003 | Pilu et al. | 348/218.1 |
| 2003/0048373 A1* | 3/2003 | Okisu et al. | 348/350 |
| 2003/0071895 A1* | 4/2003 | Higuchi et al. | 348/65 |
| 2003/0156199 A1* | 8/2003 | Shindo et al. | 348/207.99 |
| 2004/0080670 A1* | 4/2004 | Cheatle | 348/441 |
| 2004/0141157 A1* | 7/2004 | Ramachandran et al. | 353/70 |
| 2004/0183926 A1* | 9/2004 | Fukuda et al. | 348/239 |
| 2004/0227908 A1* | 11/2004 | Wada et al. | 353/94 |
| 2005/0041111 A1* | 2/2005 | Matsuoka | 348/207.99 |
| 2005/0047656 A1* | 3/2005 | Luo et al. | 382/167 |
| 2005/0134719 A1* | 6/2005 | Beck | 348/333.11 |
| 2005/0207671 A1* | 9/2005 | Saito | 382/275 |
| 2006/0251287 A1* | 11/2006 | Tsurumaki et al. | 382/100 |

FOREIGN PATENT DOCUMENTS

| | | | |
|---|---|---|---|
| EP | 0 661 871 A1 | | 7/1995 |
| JP | 05-037944 | * | 12/1993 |
| JP | 06-334914 A | | 12/1994 |
| JP | 09-284754 | * | 10/1997 |
| JP | 10-229515 A | | 8/1998 |
| JP | 2002-354331 | * | 6/2002 |
| JP | 2003-58877 A | | 2/2003 |
| JP | 2003-283909 A | | 10/2003 |
| JP | 2005-130390 | * | 5/2005 |

* cited by examiner

FIG. 1

DIGITAL STILL CAMERA

(DEFS.: +40% HOR.
0% VERT.)

FIG. 3B

(DEFS.: 0% HOR.(NO DEFS.)
0% VERT.)

FIG. 3C (DEFS.: -30% HOR.
-40% VERT.)

(PERMISSIBLE RANGES±20%)

IDENTIFIED PRINT/PICTURE
IMAGE AREA

FIG. 9B

ANGLE CORRECTION

FIG. 9C

FORM CORRECTION

OPTIMAL-STATE IMAGE PICKUP CAMERA

CROSS-REFERENCE TO RELATED APPLICATIONS

This application is based upon and claims the benefit of priority from the prior Japanese Patent Application No. 2004-129218, filed on Apr. 26, 2004, the entire contents of which are incorporated herein by reference.

BACKGROUND OF THE INVENTION

1. Technical Field

The present invention relates to digital cameras that pick up and record an image of an object such as a print/picture and store it.

2. Background Art

In the past, digital cameras are known that pick up and store an image of a print/picture. Such camera comprises a body attached through an arm to a stand on which an object whose image is to be picked up is placed such that the position at which the object image is picked up can be moved without moving the object and the camera body (for example, as disclosed by Unexamined Japanese Patent Publication No. Hei-10-229515). The camera, however, requires a sliding member that moves the position at which the object image is picked up, thereby making the whole camera large-scaled.

Images of calling cards, postcards, catalogs, signboards or bulletin boards picked up by digital cameras are more or less deformed. A method and apparatus is known that identifies and corrects a four-sided figure including such image so as to provide a non-deformed rectangular image (for example, as shown by Unexamined Japanese Patent Publication No. 2003-58877). Thus, when no image is picked up in an optimal state, when the picked-up image is too small or when the picked-up image lacks partly, a preferable image cannot be obtained even by retouching. For example, when the image pickup state of a calling card is bad, the characters printed on the calling card would be unclear. Thus, when the image of the calling card is picked up, careful pickup operation is required, for example, by finely adjusting the direction of the lens while performing the zooming-in/-out operation, which would impose a large burden on the user.

SUMMARY OF THE INVENTION

It is therefore an object of the present invention to provide a digital camera capable of picking up an image of a print/picture always in an optimal state without the necessity of manually adjusting the image pickup state carefully.

According to the present invention, there is provided a digital camera that picks up an image of a print/picture and displays it in a frame image, the camera comprising: means for identifying an area of the image of the print/picture in the frame image; and means for driving an optical system of the camera such that the identified area of the image of the print/picture is placed in an optimal state in the frame image.

Thus, the digital camera is capable of picking up an image of a print/picture always in an optimal state without the necessity of manually adjusting the image pickup state carefully. In addition, a load that would otherwise be imposed on the user is greatly reduced and various corrections can be easily made accurately on the obtained image.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 6 is a part of a flowchart indicative of the whole operation of the digital still camera that will be started when the image pickup switch is turned on;

DETAILED DESCRIPTION OF THE INVENTION

An embodiment of the digital camera according to the present invention will be described with reference to FIGS. 1-9. The digital camera comprises a portable digital still camera for use in a business meeting in a company such as a business talk, a briefing session or a deliberative council. The camera is adapted to pick up an image of a print/picture such as each of various sheet-like materials, calling cards, postcards, catalogs and whiteboards. Furthermore, the camera is usable as a general camera that picks up an image of a general object such as a person or a landscape.

The feature of this camera is that the image of the print/picture can be picked up always in an optimal state without requiring any manually careful adjustment of the image pickup state of the camera, or without strictly adjusting the direction, zoom power and focus of the lens manually for the image of the object.

Figure 1:
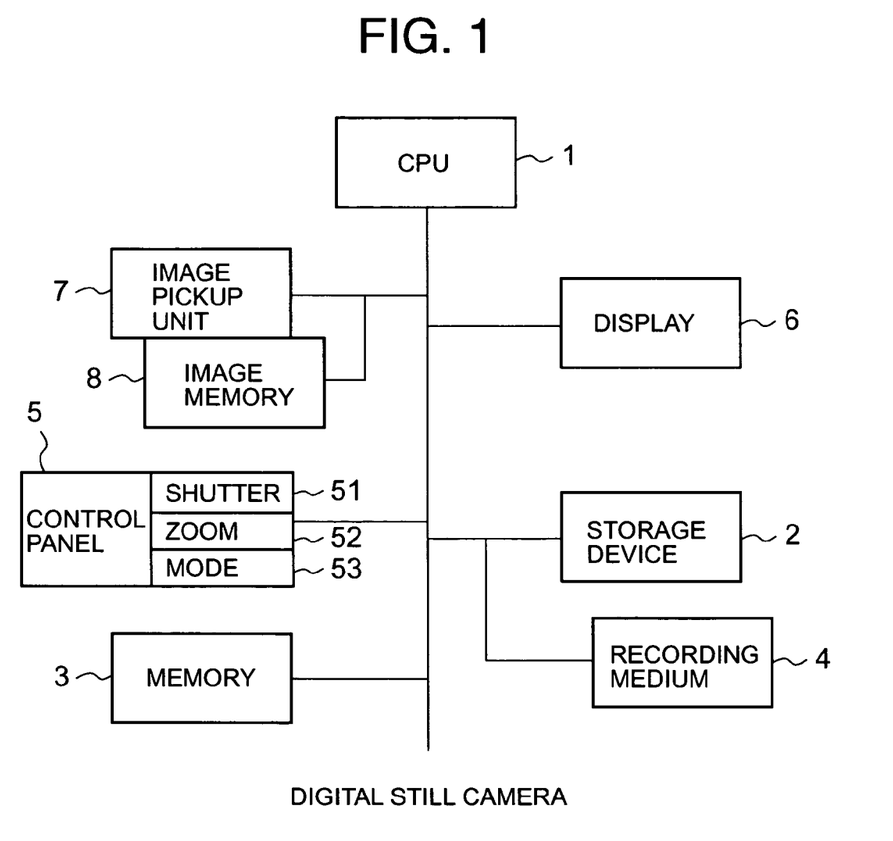
FIG. 1 is a block diagram of a digital camera according to the present invention.

The structure of this camera will be described with reference to FIG. 1. CPU 1 controls the whole operation of the camera in accordance with an operating system and various application software stored in a storage device 2, which is a fixed memory such as a hard disk that includes a program storage area and a data storage area. The storage area 2 has stored application programs for operating the digital camera in accordance with the processing of FIGS. 6-8. The respective programs and data are loaded on a working memory 3, and data in the working memory 3 is saved in the storage device 2 as needed. A recording medium 4 comprises a removable memory such as a DVD that delivers/receives a program or image data to/from the storage device 2 and/or working memory 3.

CPU 1 is connected through a bus line to a control panel 5, a display 6, an image pickup unit 7 as input/output peripheral devices thereof. The control panel 5 comprises various function buttons such as a shutter button 51, a zoom button 52, a mode button 53 that selects one of a normal mode, a print/ picture mode and a print/picture processing mode. An operation signal outputted from a respective one of these buttons is delivered to CPU 1. Display 6 comprises a liquid crystal-equipped display with a touch panel that is used as a monitor, finder or image reproduction picture.

The image pickup unit 7 comprises a lens mirror block that comprises an image pickup lens and a mirror; an image pickup element such as a CCD image sensor; and their driving systems. CPU 1 adjusts an optical zooming operation and the image pickup direction of the lens, drives an autofocus mechanism and a shutter mechanism, and controls exposure and a white balance.

Figure 2:
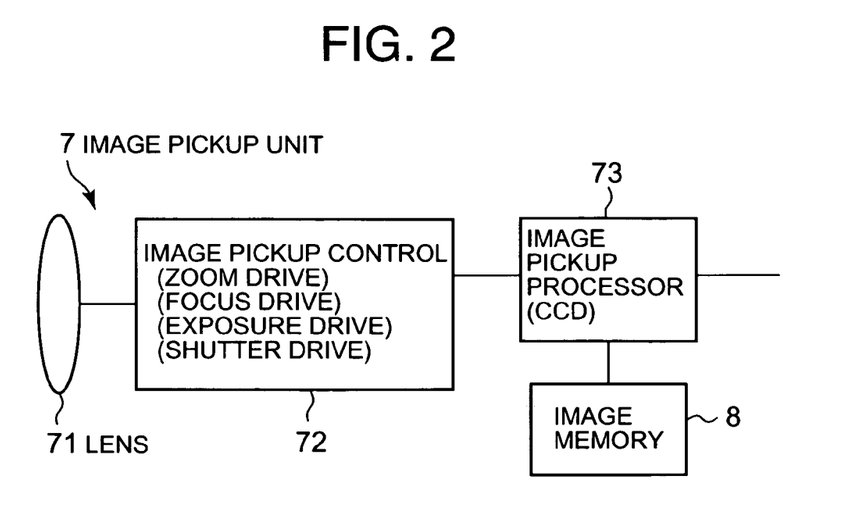
FIG. 2 illustrates the structure of an image pickup unit of the camera.

In FIG. 2, the image pickup unit 7 comprises an image pickup lens 71, an image pickup control 72 and an image processor 73. CPU 1 provides zoom drive control, focus drive control, exposure drive control, shutter drive control, and white balance control over the image pickup control 72. When appropriate, CPU 1 adjusts the direction of the image pickup lens 71 in a right/left direction and in an up/down direction. CPU 1 captures a picked-up image via an image memory 8 from the CCD image sensor of the image processor 73 and stores it on the recording medium 4.

The mode button 53 selects one of the normal mode, print/picture mode and print/picture-processing mode. In the normal mode, an image of a general object such as a person or a landscape is picked up usually. In the print/picture mode, the optical system is driven so as to pick up an image of a print/picture always in an optimal state even when neither the image pickup state determined by the optical zoom nor the image pickup direction is adjusted manually. The print/picture-processing mode comprises the print/picture mode and a correction mode that makes various corrections on the print/picture image picked up in the print/picture mode. That is, the print/picture image is picked up in an optimal state by automatically adjusting the pickup conditions of the pint/picture image in the pint/picture mode, various predetermined correcting steps are performed on the obtained print/picture image, and a resulting print/picture image is then stored. More particularly, in the print/picture processing mode CPU 1 analyzes a temporarily picked-up image including the print/picture image displayed on the monitor, thereby identifying an area of the print/picture image; automatically adjusts the optical zoom and/or the direction of the image pickup lens such that the print/picture image takes an optimal state within the frame image of the monitor, or is inscribed in a maximum size in the frame image at the center of the frame image; picks up the print/picture image in such optimal state; and then store it.

Figure 3A:
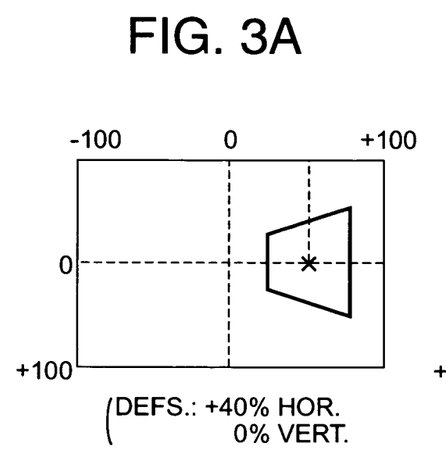
FIGS. 3A-3C show print/picture images in different deflected positions in a frame image displayed on a monitor of the camera and print/picture images.
Figure 3B:
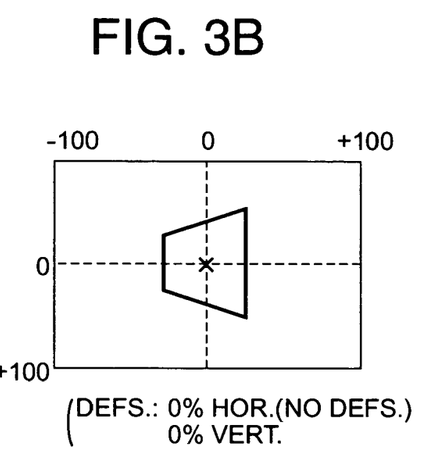
Figure 3C:
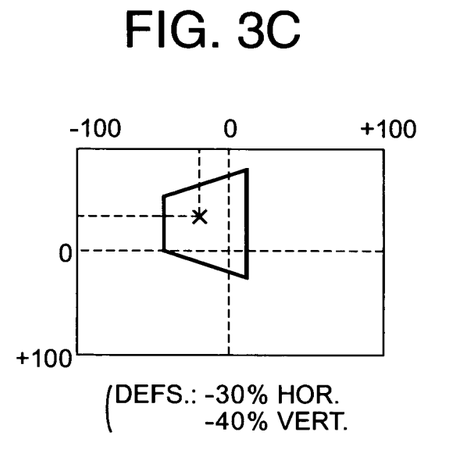
Figure 4A:
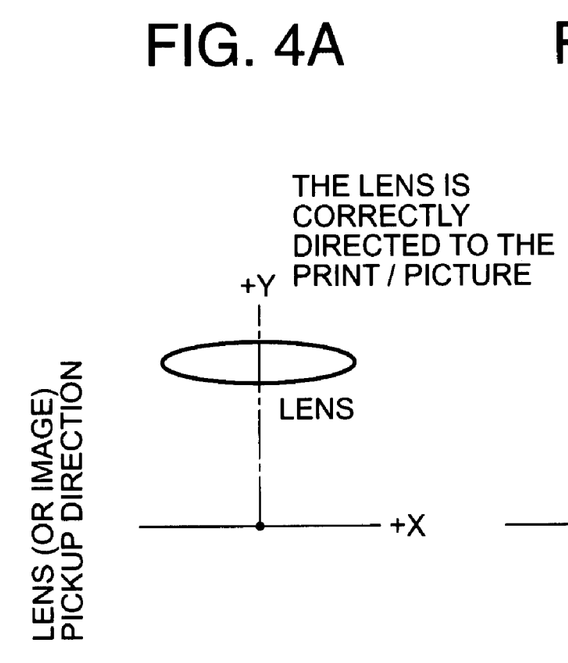
FIG. 4A illustrates that the image pickup lens is directed correctly to the print/picture.
Figures 4B, 4C:
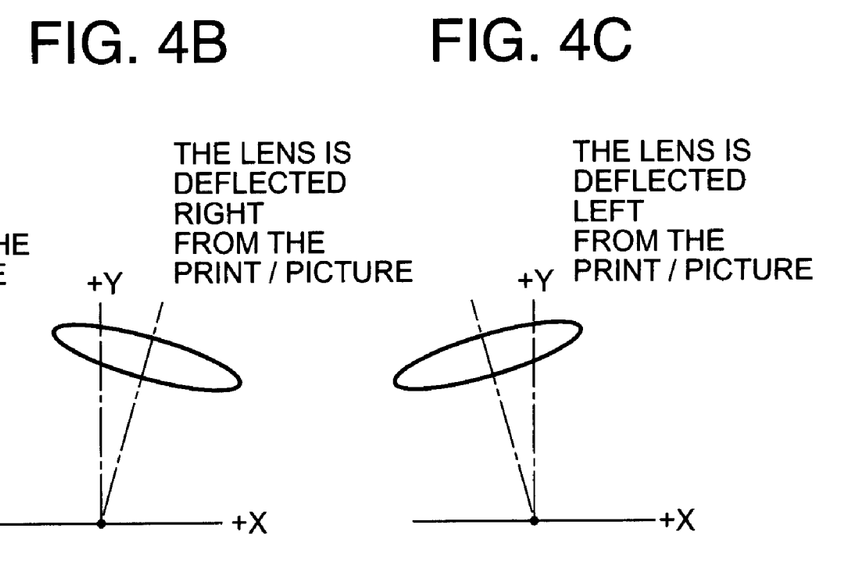
FIG. 4B illustrates that the direction of the image pickup lens is deflected rightward from the direction of the print/picture.
FIG. 4C illustrates that the direction of the image pickup lens is deflected leftward from the direction of the print/picture.

FIGS. 3 and 4 illustrate automatic adjustment of the direction of the image pickup lens for placing the print/picture image at an optimal position within the monitor frame image. It is assumed that the center of the monitor image coincides with the origin of an X-Y coordinate system. CPU 1 locates the position of the center of the print/picture image, compares the position of the center of the print/picture image with the origin, thereby knowing a direction toward which the print/picture image is deflected from the origin and a deflection value (shown by %) of the print/picture image from the origin. CPU 1 then checks to see whether or not the deflection value is within a permissible range, or whether or not the print/picture image is at substantially the center of the monitor frame image, thereby determining whether or not the print/picture image is in a substantially optimal state within the monitor frame image. If not, CPU 1 then automatically adjusts the image pickup direction such that the print/picture image is disposed at substantially the center of the monitor frame. FIG. 3A indicates that the center of the print/picture image is deflected +40% from the origin in the horizontal direction and 0% in the vertical direction; FIG. 3B indicates that the center of the print/picture image is deflected 0% from the origin in the horizontal direction and 0% in the vertical direction; and FIG. 3C indicates that the center of the print/picture image is deflected −60% from the origin in the horizontal direction and −40% in the vertical direction. Let the permissible range be ±20% in this case. Then, FIGS. 3A and 3C show that the deflection values are out of the permissible ranges and the image pickup directions are automatically adjusted depending on their deflecting directions and values. FIG. 4A illustrates that the image pickup lens is directed correctly to the print/picture. FIG. 4B illustrates that the direction of the image pickup lens is deflected rightward from the direction of the print/picture. FIG. 4C illustrates that the direction of the image pickup lens is deflected leftward from the direction of the print/picture. In the latter two cases, the respective directions of the image pickup lens are automatically corrected in the left and right directions depending on the deflection values of the print/picture image so as to eliminate their respective deflections.

Figure 5A:
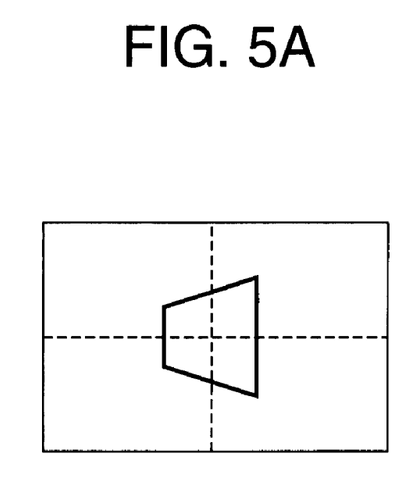
FIGS. 5A-5C illustrate automatic adjustment of the optical zoom such that the print/picture image has a maximum optimal size within the frame image.
Figure 5B:
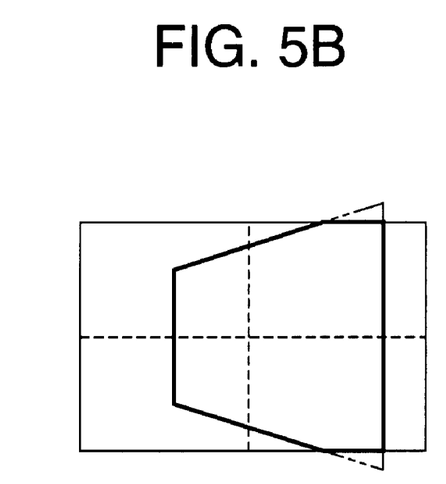
Figure 5C:
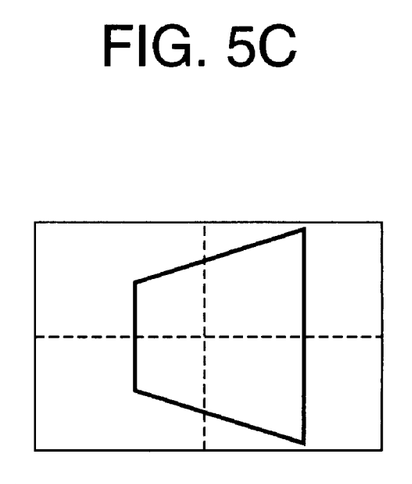

FIG. 5 illustrates a method of automatically adjusting the optical zoom such that the print/picture image has a maximum size within the monitor frame. To this end, after automatically adjusting the direction of the image pickup lens such that the print/picture image is positioned at substantially the center of, and within, the monitor frame image, CPU 1 automatically adjusts the optical zoom such that the print/picture image is put in an optimal state, or inscribed in a maximum size, in the monitor frame image. More particularly, CPU 1 zooms in stepwise on the print/picture image while checking to see whether the print/picture image has protruded outward beyond the monitor frame image. If so, CPU 1 zooms out one step on the print/picture image such that the print/picture image is inscribed in a maximum size in the monitor frame image.

In the "print/picture processing mode", CPU 1 identifies the area of a print/picture image from the monitor image, performs a form optimizing process (including an angle correction process and a trapezoid correction process) on the print/picture image such that the whole print/picture image takes the form of a rectangle, a noise filtering process on the rectangular print/picture image that filters out noise from the rectangular print/picture image, and a hue correction process on the resulting image such that a hue of the rectangular print/picture image can be read accurately, and then records or stores it.

Operation of the digital still camera of this embodiment will be described with reference to a flowchart of FIGS. 6-8. The respective functions of the camera described in the flowchart are stored in the form of a CPU readable program, in accordance with which the operation of the camera is executed in order. Alternatively, the camera can sequentially operate in accordance with program data received externally via a transmission medium (not shown).

Figure 6:
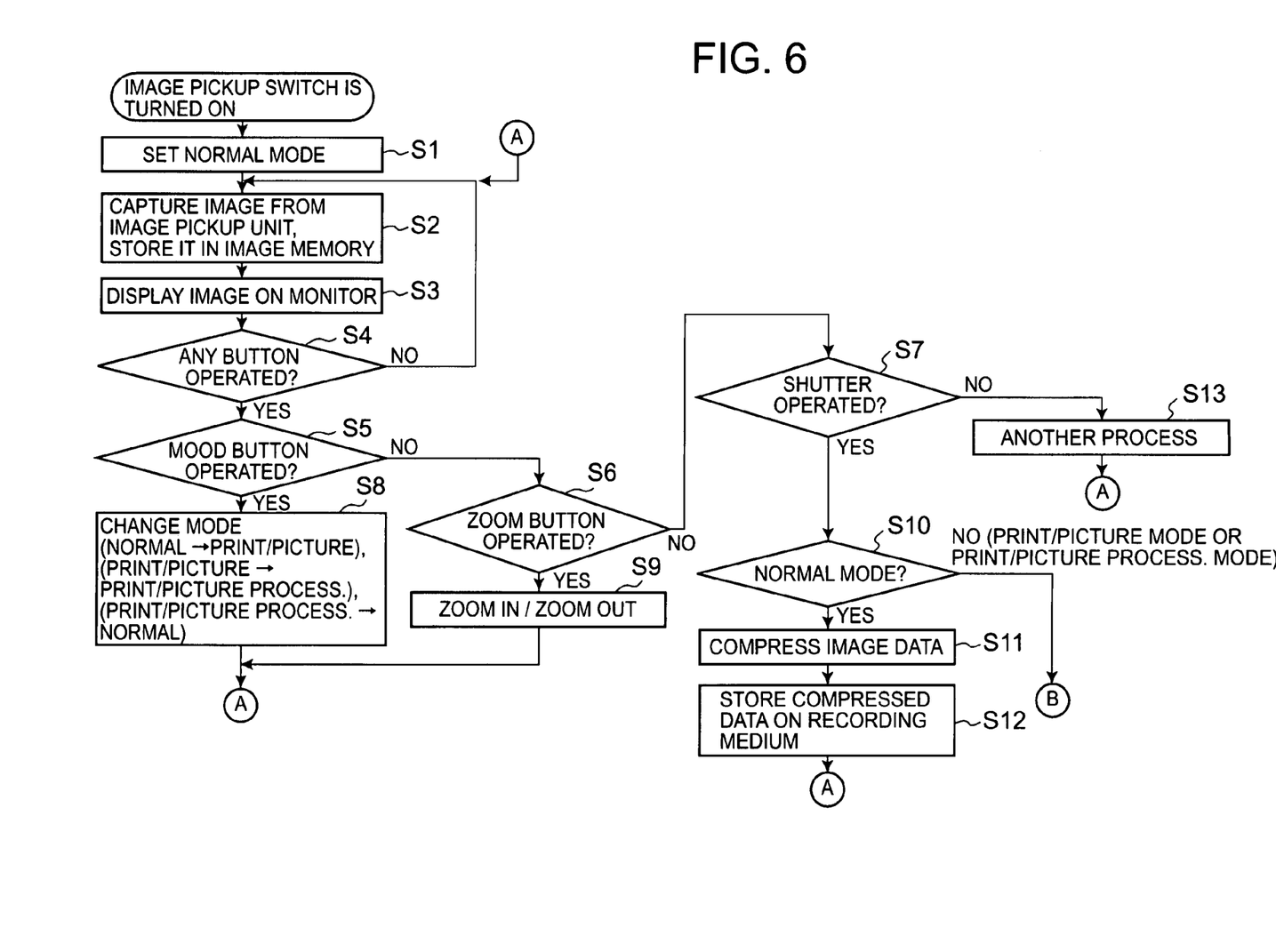
Figure 7:
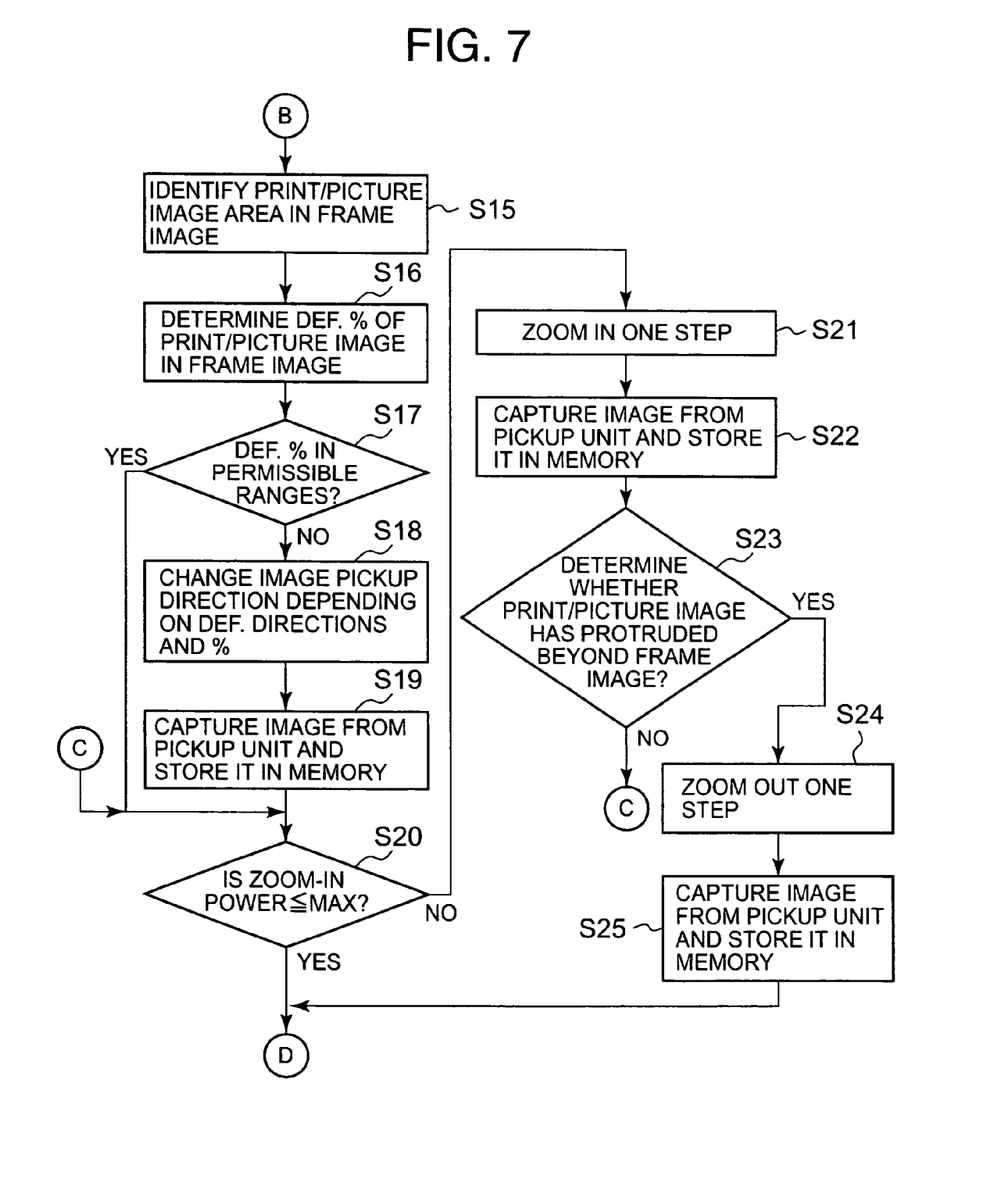
FIG. 7 is a second part of the flowchart continuing from FIG. 6.
Figure 8:
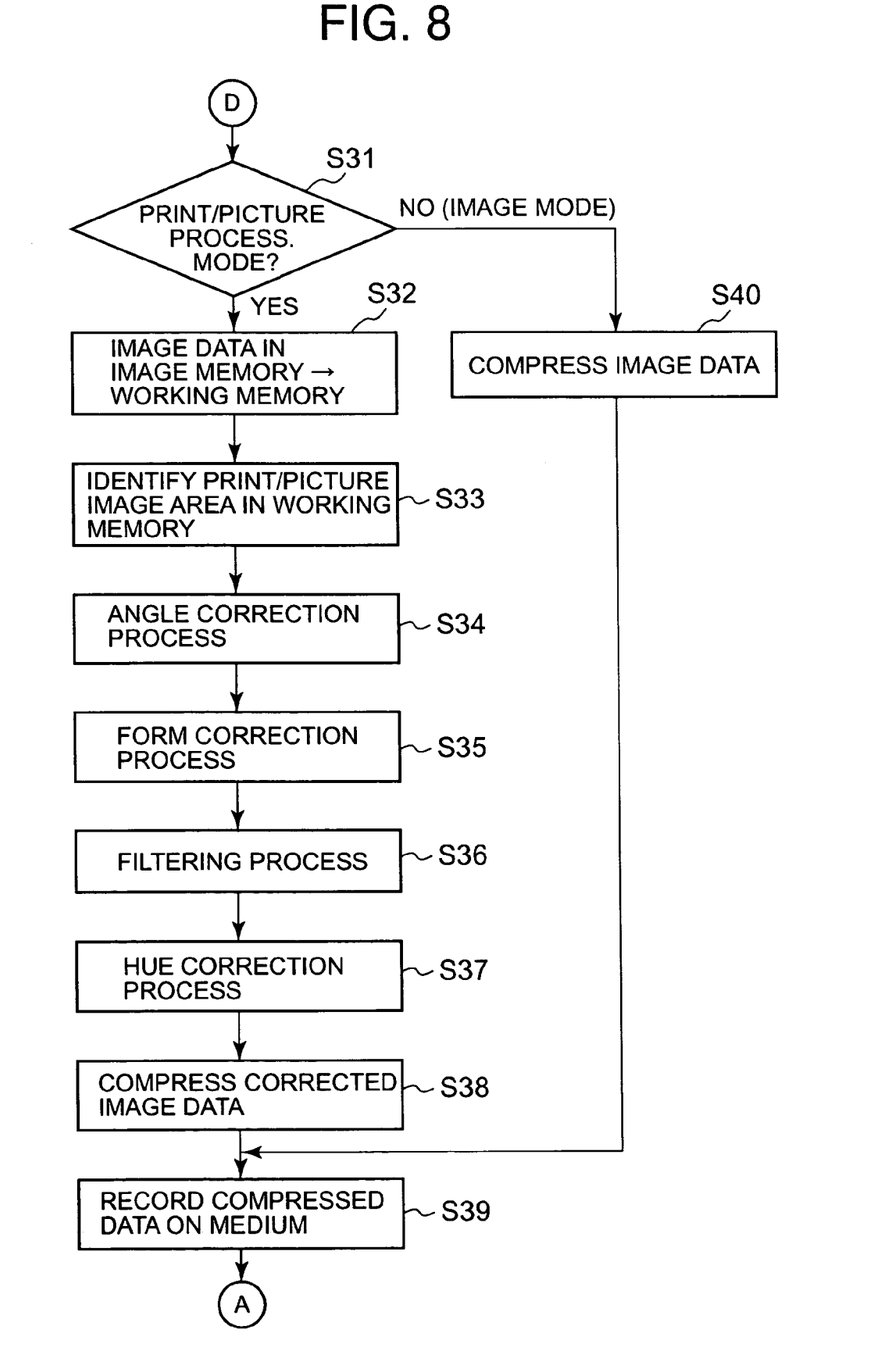
FIG. 8 is a third part of the flowchart continuing from FIG. 7.

In FIG. 6-8, first, when the image pickup switch is turned on, CPU 1 initially sets a normal mode (step S1), captures an object image from the image pickup unit 7, stores it in the image memory 8 (step S2), and then displays it on the monitor (step S3). CPU 1 then checks whether any one of the buttons is operated (step S4). If not, CPU 1 returns to step S2 and waits until any button is operated. When CPU 1 detects operation of any button, it determines which button was operated; i.e., whether the mode button 53 was operated (step S5), the zoom button 52 was operated (step S6), or the shutter button 51 or another button was operated (step S7).

If the zoom button 52 was operated in the initially set normal mode (YES in step S6), CPU 1 drives the optical zoom depending on the zoom-in or -out operation (step S9). When the shutter button 51 was operated (YES in step S7), CPU 1 reads from the image memory 8 the image picked up by the operation of the shutter on condition that the normal mode is set (step S10), compresses data on the image in accordance with an orthogonal conversion (or discrete cosine conversion) system (step S11) and then stores the compressed data on the recording medium 4 (step S12). When another button is operated in the normal mode (NO in step S7), CPU 1 performs a corresponding process (step S13), and then returns to the monitor image capturing process (step S2).

When the mode button 53 is operated (YES in step S5), CPU 1 performs a mode switching process (step S8) in which the normal mode, the print/picture mode and the print/picture processing mode are sequentially and cyclically selected one at a time in this order each time the mode button 53 is operated. That is, if the mood button is operated when the normal mode is set, the print/picture mode is selected; when the print/picture is set, the print/picture processing mode is selected; and when the print/picture-processing mode is set, the normal mode is selected. When the shutter button 51 is operated in the print/picture mode, CPU 1 goes through steps S7 and S10 to a process of steps S15-S25 in FIG. 7 in which the optical system is automatically adjusted such that the print/picture image can be picked up in an optimal state. More particularly, CPU 1 identifies the area of the print/picture image, for example, of a postcard (step S15). Then, as shown in FIG. 3, the CPU 1 locates the position of the center of the print/picture image, compares the position of the center of the image with that of the center of the monitor frame image (or the origin of the X-Y coordinate system), thereby obtaining deflection values in vertical and horizontal directions of the print/picture image from the position of the center the monitor frame image (step 16). Then, CPU 1 checks to see whether the vertical and horizontal deflection values are within the respective permissible ranges or the print/picture image is at an optimal position within, or at substantially the center of, the monitor frame image (step S17).

If the vertical and horizontal deflection values are within the respective permissible ranges (YES in step S17), CPU 1 goes to step S20 without altering the direction of the image pickup lens 71. If the deflection values are not within the respective permissible ranges, CPU 1 automatically adjusts the image pickup direction (or conditions) of the lens 71 depending on the deflecting directions and deflection values of the print/picture image (step S18). This leading to positioning the print/picture image at the center of the monitor frame image. CPU 1 then captures from the image pickup unit 7 the image obtained immediately after the image pickup directions were automatically adjusted, and then stores it in the image memory 8 (step S19).

Then, CPU 1 automatically adjusts the optical zoom such that the print/picture image is inscribed in an optimal or maximum size in the monitor frame image. More particularly, CPU 1 checks the present set state of the optical zoom (step S20). If the zoom-in power is less than a maximum one (for example, of 4), CPU 1 causes the optical zoom to zoom in one step, or by a zoom power, for example, of 0.5, on the print/picture image and then provides focus control (step S21). Thus, when the print/picture image is enlarged and picked up, CPU 1 captures from the image pickup unit 7 the image obtained immediately after the zoom-in operation and then stores it in the image memory 8 (step S22). CPU 1 then checks to see whether the print/picture image has protruded outward beyond the monitor frame image (step S23). If not (NO in step S23), CPU 1 returns to step S20. Then, CPU 1 causes the optical zoom to zoom in one step at a time on the print/picture image while updating the stored image in the image memory 8 until the zoom-in power reaches its maximum (step S20) or the print/picture image has protruded outward beyond the monitor frame image (step S23). When the zoom power reaches its maximum before the print/picture has protruded outward beyond the monitor image frame, CPU 1 goes to step S31 of FIG. 8. When the print/picture image has protruded outward beyond the monitor frame image before the zoom-in power reaches its maximum, CPU 1 causes the optical zoom to zoom out one step (step S24), captures from the image pickup unit 7 the image obtained immediately after the zooming-out operation and stores it in the image memory 8 (step S25).

CPU 1 then goes to step S31 of FIG. 8 to determine the present operating mode. When the "print/picture mode" is set (NO in step S31), CPU 1 reads from the image memory 8 the present image, compresses data on the image in accordance with the orthogonal conversion system (step S40), stores the compressed image data on the recording medium 4 (step S39), and then returns to step S2 of FIG. 6 for acquiring another monitor image. When the "print/picture processing mode is set, CPU 1 loads the image, read from the image memory 8, in the working memory 3 (step S32), and then identifies the area of the print/picture image in the read image (step S33).

Figure 9A:
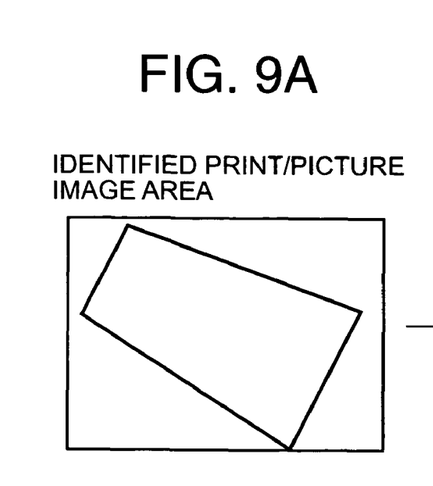
FIGS. 9A-9C illustrate steps for obtaining a nondeformed image from the picked-up image.
Figure 9B:
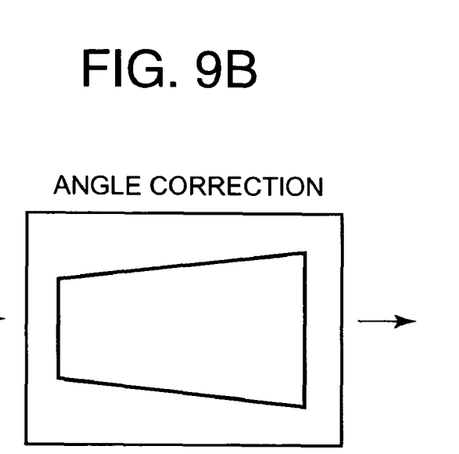
Figure 9C:
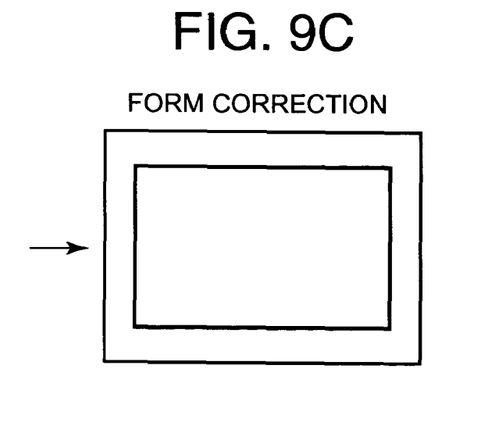

CPU 1 then performs angle correction on the area of the print/picture image (step S34). For example, if the image of a rectangular calling card that is disposed at an angle to the camera frame is picked up by the camera diagonally from above, the resulting image of the calling card will become trapezoid and inclined relative to the frame image, as shown in FIG. 9 (A). The reason why the resulting image of the calling card becomes trapezoid is that the surface of the card is inclined relative to the surface of the frame. In such a case, angle correction is performed on the image, including rotating the image depending on its angle of inclination, as shown in FIG. 9 (B). Then, CPU 1 performs form correction on the image of FIG. 9 (B) that includes correcting the trapezoid print/picture image such that the shorter side of the trapezoid equals its opposite longer side in length, thereby taking the original rectangular form (step S35), as shown in FIG. 9 (C). After this process, CPU 1 performs a noise filtering process on the resulting image that includes filtering out noise from the image (step S36), and a hue correction process on the resulting image that includes correcting a hue of the image such that the image can be read clearly (step S37). Then, CPU 1 compresses the resulting image in the orthogonal conversion system (step S38), stores the compressed image on the recording medium 4 (step S39), and then returns to step S2 of FIG. 6 to capture another monitor image.

Conclusions

As described above, in the digital still camera of this embodiment CPU 1 analyzes a temporarily picked-up monitor image including an image of a print/picture before pick-up of the actual image of the print/picture, identifies the area of this image, and drives the pickup control unit 72 of the image pickup unit 7 such that the print/picture image is placed in an optimal or predetermined state within the monitor frame image. Thus, the print/picture image is picked up in an optimal state without the necessity of manually adjusting the image pickup state carefully, and a burden that would otherwise be imposed on the user is greatly reduced. Thus, various corrections can be made easily and accurately on the image picked up in its optimal state.

Since the camera operation mode is switched between the normal mode and the print/picture mode, the camera can be used as not only as a dedicated print/picture image pickup camera, but also as a general camera. In the print/picture mode CPU 1 identifies the area of an image of a sheet or board-like print/picture such as, for example, a calling card, a postcard, a white board or a signboard.

CPU 1 can change the direction of the image pickup lens such that the print/picture image is positioned at the center of the monitor image frame. Thus, the print/picture image can be picked up always at an appropriate position. In addition, the optical zoom is driven such that the print/picture image is inscribed in a maximum size in the monitor frame image.

Then, CPU 1 performs a form optimizing process on the resulting print/picture image such that the print/picture image becomes correctly rectangular. In addition, after this, CPU 1 performs a noise filtering process on the print/picture image, thereby filtering out noise from the print/picture image. Thus, an ideal print/picture image is then recorded.

While in the embodiment the lens direction is illustrated as alterable to change the image pickup direction automatically and the optical zoom as drivable to change the image pickup power automatically, the stop mechanism may further be driven so as to change the exposure automatically.

While in the embodiment only the print/picture image picked up under the pickup conditions set after the automatic adjustment is illustrated as recorded or stored, the whole image including the print/picture image picked up actually under the automatically adjusted pickup conditions may be recorded or stored.

While in the embodiment the camera is illustrated as performing the noise filtering process that includes filtering out noise from the print/picture image corrected in the form optimizing process and then the hue correction process that corrects the hue of the resulting image such that the image can be read clearly, these processes may be performed on the side of another electronic device such as a personal computer.

While in the embodiment the present invention is illustrated as applied to the portable print/picture image pickup camera for use in business meetings, thereby picking up an image of each of various materials, calling cards, postcards, catalogs or whiteboards for use in business talks, briefing sessions, deliberative councils, etc., the present invention is also applicable to a print/picture image pickup camera attached through an arm to a print/picture stand as one option in a projector. In this case, the camera may be one removable from the projector so as to pick up an image, for example, of a whiteboard. In addition, the camera may be used for any general purposes and not limited only to use in business meetings.

Recording media, for example, of CD-ROMs, flexible disks or RAM cards on which programs that cause the respective aforementioned means to fulfill their functions are recorded may be provided for computers.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A digital camera that picks up an image of a document and displays the image of the document as a frame image on an image monitor, the camera comprising:
    means for identifying an area of the document in the frame image;
    first control means for automatically adjusting an image pickup direction of the camera, by correcting a direction of an image pickup lens of an optical system of the camera, based on deflection directions and values of the identified area of the document with respect to a center of the frame image; and
    second control means for automatically driving the optical system to control an image pickup magnification of the optical system and thereby control a size of the image of the document to be picked up;
    wherein the deflection directions and values are obtained by comparing a center of the identified area of the document with the center of the frame image.

2. The digital camera of claim 1, wherein the first control means adjusts the image pickup direction of the camera such that the identified area of the document is positioned at the center of the frame image.

3. The digital camera of claim 1, wherein the second control means drives the optical system such that the identified area of the document is inscribed in a maximum size in the frame image.

4. The digital camera of claim 1, further comprising:
    means for selecting one of a print/picture image pickup mode in which the image of the document is picked up and a general pickup mode in which an image of any object is picked up; and
    wherein the identifying means and the first and second control means are operated in the print/picture mode.

5. The digital camera of claim 1, further comprising:
    means for correcting the identified area of the document in the image of the document so as to be rectangular in shape.

6. The digital camera of claim 5, further comprising means for eliminating noise from the image of the document.

7. A non-transitory computer readable medium having stored thereon a program for controlling a camera that picks up an image of a document and displays the image of the document as a frame image on an image monitor, said program controlling said camera to execute functions comprising:
    identifying an area of the document in the frame image;
    automatically adjusting an image pickup direction of the camera, by controlling a direction of an image pickup lens of an optical system of the camera, based on deflection directions and values of the identified area of the document with respect to a center of the frame image; and
    automatically driving the optical system to control an image pickup magnification of the optical system and thereby control a size of the image of the document to be picked up;
    wherein the deflection directions and values are obtained by comparing a center of the identified area of the document with the center of the frame image.

* * * * *